United States Patent
Bhattacharya

(10) Patent No.: US 9,667,559 B2
(45) Date of Patent: May 30, 2017

(54) MPLS AND GMPLS TUNNEL FLAP DAMPENING IN TRAFFIC ENGINEERED NETWORKS

(71) Applicant: Ciena Corporation, Hanover, MD (US)

(72) Inventor: Somen Bhattacharya, Santa Clara, CA (US)

(73) Assignee: Ciena Corporation, Hanover, MD (US)

(*) Notice: Subject to any disclaimer, the term of this patent is extended or adjusted under 35 U.S.C. 154(b) by 557 days.

(21) Appl. No.: 14/171,206

(22) Filed: Feb. 3, 2014

(65) Prior Publication Data

US 2015/0222557 A1    Aug. 6, 2015

(51) Int. Cl.
| | |
|---|---|
| H04L 12/26 | (2006.01) |
| H04L 12/723 | (2013.01) |
| H04L 12/823 | (2013.01) |
| H04L 12/24 | (2006.01) |
| H04L 12/707 | (2013.01) |
| H04L 12/721 | (2013.01) |

(52) U.S. Cl.
CPC .............. *H04L 47/32* (2013.01); *H04L 41/00* (2013.01); *H04L 45/22* (2013.01); *H04L 45/38* (2013.01); *H04L 45/50* (2013.01)

(58) Field of Classification Search
CPC ......... H04L 47/32; H04L 45/50; H04L 45/38; H04L 43/08
See application file for complete search history.

(56) References Cited

U.S. PATENT DOCUMENTS

| | | | | |
|---|---|---|---|---|
| 7,206,861 B1* | 4/2007 | Callon | .................... | H04L 47/10 370/389 |
| 7,519,705 B1* | 4/2009 | Papagiannaki | ..... | H04L 43/0876 709/224 |
| 2003/0091029 A1* | 5/2003 | Jo | ........................ | H04L 41/5022 370/352 |
| 2011/0063972 A1* | 3/2011 | Muley | ................. | H04L 12/1877 370/225 |
| 2014/0341042 A1* | 11/2014 | Racz | ..................... | H04L 47/122 370/237 |
| 2015/0063122 A1* | 3/2015 | Chiang | ................... | H04L 45/24 370/238 |

(Continued)

OTHER PUBLICATIONS

D. Awduche et al., "RSVP-TE: Extensions to RSVP for LSP Tunnels". Network Working Group, Request for Comments: 3209, Category: Standards Track. Dec. 2001. p. 1-61.

(Continued)

*Primary Examiner* — Gbemileke J Onamuti
(74) *Attorney, Agent, or Firm* — Clements Bernard Walker PLLC; Christopher L. Bernard; Lawrence A. Baratta, Jr.

(57) ABSTRACT

Embodiments of the disclosure are directed to tunnel flap damping in a traffic engineered network. One exemplary method for tracking a re-routing history of Multi-Protocol Label Switching ("MPLS")/Generalized MPLS ("GMPLS") tunnels over intervals includes measuring a number of policy-based re-routes during at least one measurement interval; determining a tunnel re-route frequency based on the measurement; comparing the tunnel re-route frequency to a frequency threshold; and determining if the tunnel re-route frequency exceeds the frequency threshold and, if the tunnel re-route frequency exceeds the frequency threshold, delaying at least one tunnel re-route.

16 Claims, 5 Drawing Sheets

(56) References Cited

U.S. PATENT DOCUMENTS

2015/0188801 A1* 7/2015 Dasgupta ............... H04L 41/16
709/243

OTHER PUBLICATIONS

E. Mannie, "Generalized Multi-Protocol Label Switching (GMPLS) Architecture". Network Working Group, Request for Comments: 3945, Category: Standards Track. Oct. 2004. p. 1-69.
L. Berger, "Generalized Multi-Protocol Label Switching (GMPLS) Signaling Functional Description". Network Working Group, Request for Comments: 3471, Category: Standards Track. Jan. 2003. p. 1-34.
L. Berger, "Generalized Multi-Protocol Label Switching (GMPLS) Signaling Resource Reservation Protocol-Traffic Engineering (RSVP-TE) Extensions". Network Working Group, Request for Comments: 3473, Category: Standards Track. Jan. 2003. p. 1-42.
K. Kompella et al., "OSPF Extensions in Support of Generalized Multi-Protocol Label Switching (GMPLS)". Network Working Group, Request for Comments: 4203, Category: Standards Track. Oct. 2005. p. 1-11.
T. Li et al., "IS-IS Extensions for Traffic Engineering". Network Working Group, Request for Comments: 5305, Category: Standards Track. Oct. 2008. p. 1-17.
J.P. Lang et al., "RSVP-TE Extensions in Support of End-to-End Generalized Multi-Protocol Label Switching (GMPLS) Recovery". Network Working Group, Request for Comments: 4872, Category: Standards Track. May 2007. p. 1-47.
L. Berger et al., "GMPLS Segment Recovery". Network Working Group, Request for Comments: 4873, Category: Standards Track. May 2007. p. 1-25.
A. Farrel et al., "A Framework for Inter-Domain Multiprotocol Label Switching Traffic Engineering". Network Working Group, Request for Comments: 4726, Category: Informational. Nov. 2006. p. 1-22.
A. Farrel et al., "Inter-Domain MPLS and GMPLS Traffic Engineering—Resource Reservation Protocol-Traffic Engineering (RSVP-TE) Extensions". Network Working Group, Request for Comments: 5151, Category: Standards Track. Nov. 2008. p. 1-25.
A. Ayyangar et al., "Label Switched Path Stitching with Generalized Multiprotocol Label Switching Traffic Engineering (GMPLS TE)". Network Working Group, Request for Comments: 5150, Category: Standards Track. Feb. 2008. p. 1-19.
S. Yasukawa, "Signaling Requirements for Point-to-Multipoint Traffic-Engineered MPLS Label Switched Paths (LSPs)". Network Working Group, Request for Comments: 4461, Category: Informational. Apr. 2006. p. 1-30.
R. Aggarwal et al., "Extensions to Resource Reservation Protocol—Traffic Engineering (RSVP-TE) for Point-to-Multipoint TE Label Switched Paths (LSPs)". Network Working Group, Request for Comments: 4875, Category: Standards Track. May 2007. p. 1-53.
M. Bocci et al., "A Framework for MPLS in Transport Networks". Internet Engineering Task Force (IETF), Request for Comments: 5921, Category: Informational. Jul. 2010. p. 1-56.
B. Niven-Jenkins et al., "Requirements of an MPLS Transport Profile". Network Working Group, Request for Comments: 5654, Category: Standards Track. Sep. 2009. p. 1-31.
N. Sprecher et al., "MPLS Transport Profile (MPLS-TP) Survivability Framework". Internet Engineering Task Force (IETF), Request for Comments: 6372, Category: Informational. Sep. 2011. p. 1-56.
D. Frost et al., "Packet Loss and Delay Measurement for MPLS Networks". Internet Engineering Task Force (IETF), Request for Comments: 6374, Category: Standards Track. Sep. 2011. p. 1-52.
D. Frost et al., "A Packet Loss and Delay Measurement Profile for MPLS-Based Transport Networks". Internet Engineering Task Force (IETF), Request for Comments: 6375, Category: Standards Track. Sep. 2011. p. 1-5.
Y. Weingarten et al., "MPLS Transport Profile (MPLS-TP) Linear Protection". Internet Engineering Task Force (IETF), Request for Comments: 6378, Category: Standards Track. Oct. 2011. p. 1-45.
A. Farrel et al., "A Path Computation Element (PCE)-Based Architecture". Network Working Group, Request for Comments: 4655, Category: Informational. Aug. 2006. p. 1-45.
J. Ash et al., "Path Computation Element (PCE) Communication Protocol Generic Requirements". Network Working Group, Request for Comments: 4657, Category: Informational. Sep. 2006. p. 1-21.
JL. Le Roux et al., "OSPF Protocol Extensions for Path Computation Element (PCE) Discovery". Network Working Group, Request for Comments: 5088, Category: Standards Track. Jan. 2008. p. 1-20.
JL. Le Roux et al., "IS-IS Protocol Extensions for Path Computation Element (PCE) Discovery". Network Working Group, Request for Comments: 5089, Category: Standards Track. Jan. 2008. p. 1-17.
B. Claise, "Specification of the IP Flow Information Export (IPFIX) Protocol for the Exchange of IP Traffic Flow Information". Network Working Group, Request for Comments: 5101, Category: Standards Track. Jan. 2008. p. 1-63.

\* cited by examiner

MPLS AND GMPLS TUNNEL FLAP DAMPENING IN TRAFFIC ENGINEERED NETWORKS

BACKGROUND OF THE INVENTION

1. Field of the Invention

Embodiments of the disclosure are directed to optimizing routing and wavelength assignment in network.

2. Description of the Related Art

On a pure IP network, if a route becomes unavailable, packets can be forwarded along other routes to the same destination. This mechanism allows packets to be serviced before the topology change is advertised throughout the network.

To avoid IP lookup, Multi-Protocol Label Switching Traffic Engineering ("MPLS-TE") can carry extra information, such as a label. Packets can be forwarded using label-based lookups. MPLS-TE allows the source to make routing decisions. The ingress can attach a label to an IP packet and let intermediate routers make forwarding decisions.

Present MPLS-based traffic engineered transport services deployed in the industry mostly uses policy-based re-optimization of tunnels that is either triggered by Interior Gateway Protocol ("IGP")-TE advertisements of TE link resources or a periodic timer expiry based. This re-optimization can be achieved via constrained path re-computation and tunnel reroute along the new path using "make-before-break" method. The policy constrained tunnel paths may optimize the individual tunnel's resource goals. Tunnel flapping, or frequent re-routing, due to conflicting impact of multiple different reroute policies applied across different parts of the network may not be monitored and therefore not prevented.

In the traffic engineered networks, the MPLS/GMPLS tunnels are often re-optimized under policy control to meet the traffic engineering goals of tunneling services and also to optimally utilize the traffic engineering resources of the network topology. However policy controlled re-optimization involve re-routing of tunnels across parts of the network, as determined by the policy constrained path computation.

The policy constrained tunnel paths may optimize the individual tunnel's resource goals. However policy constraints effective on different tunnel paths, across different parts of a traffic engineered network may conflict against each other's resource optimization goals.

The policy constraints may trigger continuous re-routing of RSVP-TE & GMPLS-RSVP-TE signaled dynamic tunnels using the principle of 'Make-Before-Break' to satisfy the policy goals, even when there is no physical or logical faults in the traffic engineering network. The continuous re-routing of dynamic RSVP-TE & GMPLS-RSVP-TE signaled tunnels through the TE network constitute tunnel flaps, which is not desirable.

The continuous re-routing of MPLS & GMPLS tunnels due to policy applications may generate significant amount of processing overhead on the TE node's control plane and also consume Link B/W resources competing against the resources meant for SLA agreed customer traffic. The present MPLS/GMPLS based traffic engineered transport services deployed in the industry mostly uses policy based re-optimization of tunnels that is either triggered by IGP-TE advertisements of TE Link resources or a periodic timer expiry based.

The re-optimization is achieved via constrained path re-computation and tunnel re-route along the new path using 'Make-before-break' method of re-signaling the tunnels. Frequent re-routing (i.e. Tunnel Flapping) due to conflicting impact of multiple different re-route policies applied across different parts of the network is not monitored and also not prevented.

The present state-of-the-art traffic engineering re-optimization is based on the IGP-TE re-advertisement of TE-Link resources and application of network policies and per-Tunnel policies at the origin of the Tunnel. The impact of frequent Tunnel re-routing (Tunnel Flapping) under policy based re-optimization is not considered in evaluating the performance, reliability and availability of MPLS/GMPLS tunnel services. The impact of Tunnel flapping is also not considered in evaluating the availability and effective utilization of TE-Link resources in the traffic engineered networks.

SUMMARY

Systems and methods according to various exemplary embodiments can include features and benefits such as, but not limited to, MPLS/GMPLS based dynamic traffic engineered transport services.

According to one embodiment, a method for tracking a re-routing history of Multi-Protocol Label Switching ("MPLS")/Generalized MPLS ("GMPLS") tunnels over intervals comprises measuring a number of policy-based re-routes during at least one measurement interval; determining a tunnel re-route frequency based on the measurement; comparing the tunnel re-route frequency to a frequency threshold; and determining if the tunnel re-route frequency exceeds the frequency threshold and, if the tunnel re-route frequency exceeds the frequency threshold, delaying at least one tunnel re-route.

Other aspects and advantages associated with the embodiments disclosed herein will become apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Data communication networks may include various computers, servers, nodes, routers, switches, bridges, hubs, proxies, and other network devices coupled to and configured to pass data to one another. These devices are referred to herein as "network elements" or "network devices." Data is communicated through the data communication network by passing protocol data units, such as Internet Protocol (IP) packets, Ethernet Frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

Figure 1:
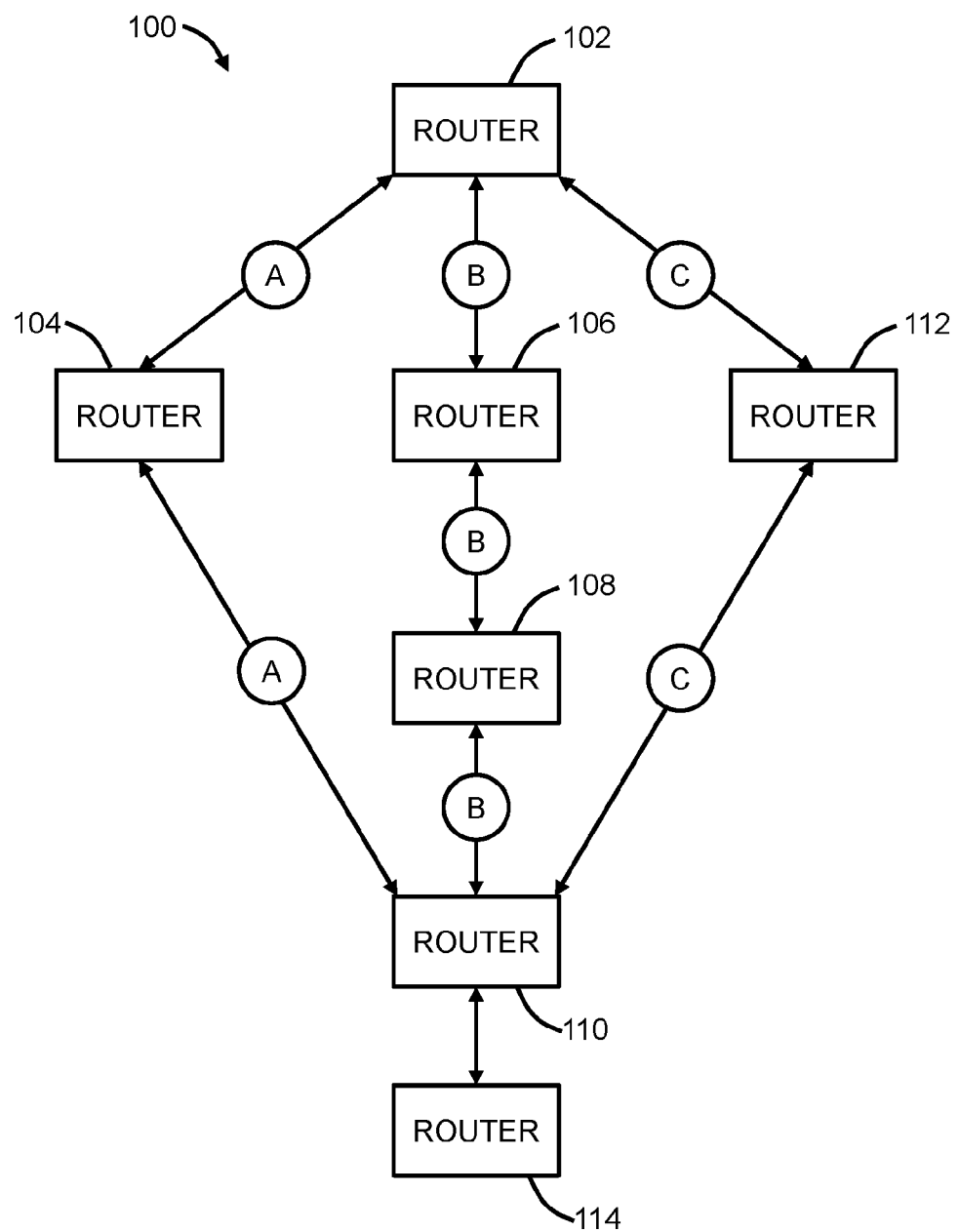
FIG. 1 illustrates an exemplary make-before-break mechanism in an MPLS-TE tunnel, which is known in the art.

The detailed description uses the following list of terminologies in the context of describing tunnel flapping, optimized routing, and wavelength assignment in a network:
ARMA—Auto Regressive Moving Average
ASON—Automatic Switched Optical Network
BGP—Border Gateway Protocol
BRPC—Backward Recursive Path Computation
BSS—Business Support System
DSCP—Differentiated Services Code Point
ECMP—Equal Cost Multiple Paths
EMS—Element Management System
EWMA—Exponential Weighted Moving Average
IETF—Internet Engineering Task Force
IS-IS—Intermediate System to Intermediate System
ISIS-TE—IS-IS Traffic Engineering
LSA—Link State Advertisement
LSP—Link State Packet
MC—Multicast
MPLS—Multi-Protocol Label Switching
MP-BGP—Multi-Protocol BGP
GMPLS—Generalized Multi-Protocol Label Switching.
GMPLS-ISIS-TE—GMPLS Extension to ISIS-TE.
GMPLS-OSPF-TE—GMPLS Extension to OSPF-TE.
NMS—Network Management System
OAM—Operations Administration and Management
OSPF—Open Shortest Path First
OSPF-TE—OSPF Traffic Engineering.
OSS—Operations Support System
P2MP—Point-To Multi-Point
PCE—Path Computation Engine
PCC—Path Computation Client
PCS—Path Computation Server
PIM—Protocol Independent Multicast
RSVP—Resource Reservation Protocol
RSVP-TE—RSVP Traffic Engineering
TLV—Type, Length and Value
UC—Unicast FIG. 1 illustrates an exemplary make-before-break mechanism in a Multi-Protocol Label Switching Traffic Engineering ("MPLS-TE") network 100, which is known in the art. The network 100 includes routers 102-114 arranged so that router 102 and router 114 are the beginning and end points in the network 100. Three paths are designated in the network 100. Path A is a path from router 102 to router 114 that travels through router 104. Path B is a path from router 102 to router 114 that travels through router 106, router 108, and router 110. Path C is a path from router 102 to router 114 that travels through router 112. Each path can be used as a tunnel for data to transfer from router 102 to router 114.

In a traffic engineered networks, the MPLS/GMPLS tunnels can be re-optimized under policy control to meet traffic engineering goals of tunneling services and also to optimally utilize traffic engineering resources of the network. To re-optimize, a tunnel's path can be re-computed and the tunnel can be re-routed along a different path. For example, a first tunnel may use Path A, a second tunnel may use Path B, and a third tunnel may use Path C. Each tunnel may have its own re-optimization policy. The first tunnel may be re-optimized under its own policy, and the first tunnel may be re-routed from Path A to Path C for a variety of reasons (e.g., increase of congestion overhead, decrease of remaining available bandwidth shared by Paths, etc.). The third tunnel's policy re-optimization may determine that Path C is too congested and re-routes from Path C to Path B. The second tunnel may then be re-routed from Path B to Path A. As more data is provided, the tunnels may continue to be re-optimized.

Tunnel re-route may keep repeating depending of the availability of bandwidth resources in different traffic engineered classes and the signaled traffic engineered classes of Tunnels and other TE constraints mandated by the Tunnel's policies. Re-optimization may occur without any physical or logical faults in the network 100 using a "Make-Before-Break" mechanism.

Figure 2:
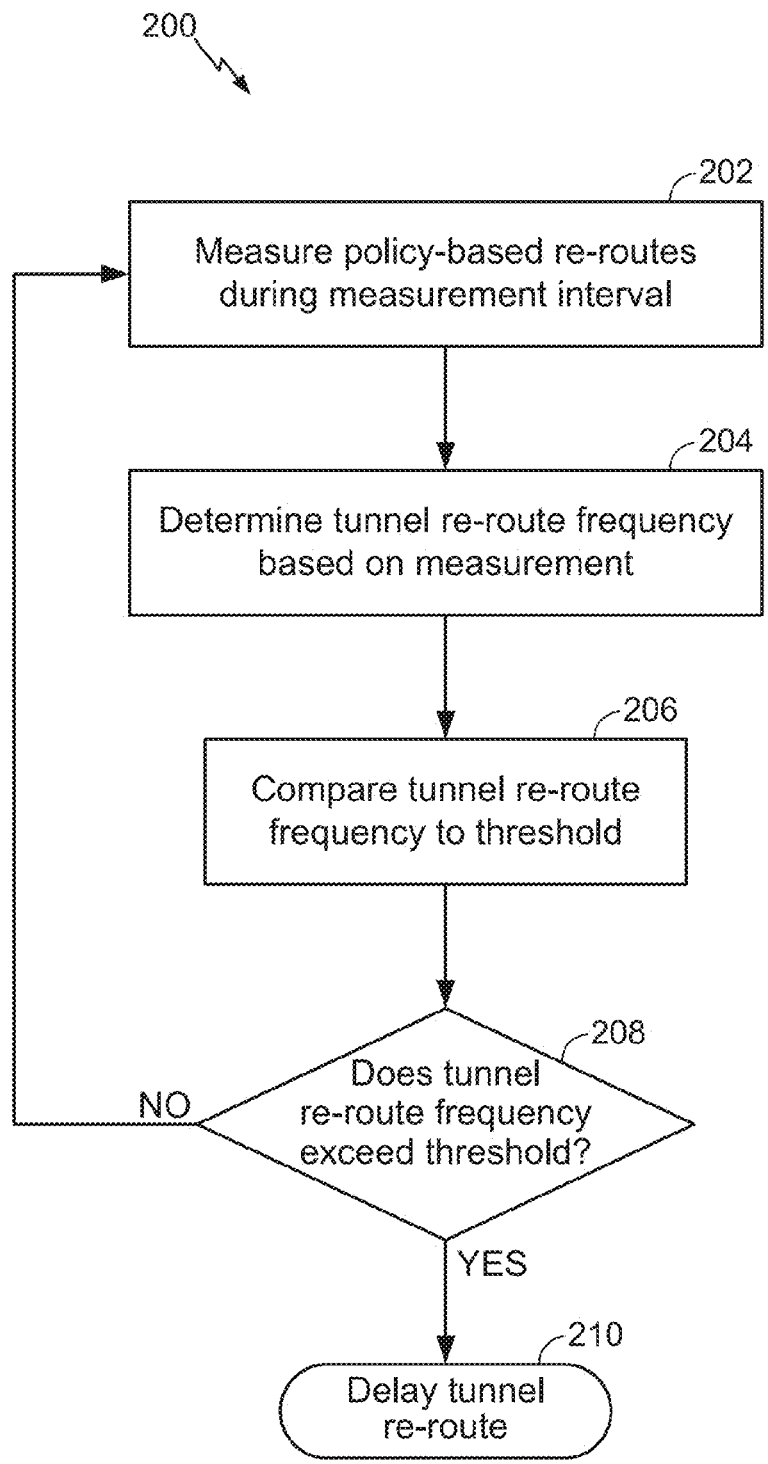
FIG. 2 illustrates an exemplary flow for tunnel flap dampening in traffic engineered networks.

FIG. 2 illustrates an exemplary flow 200 for tunnel flap dampening in traffic engineered networks. At 202, a number of policy-based re-routes can be measured during at least one measurement interval.

At 204, a tunnel re-route frequency can be determined based on the measurement. In some embodiments, calculating an average number of re-routes can be calculated over the at least one measurement interval to determine a tunnel re-route frequency. For example, an Auto-Regressive Moving Average ("ARMA") model can be used. The Auto-Regressive model, AR(p), can be defined as the autoregressive model of order p. The AR(p) model is written:

$$X_t = c + \sum_{i=1}^{p} \varphi_i X_{t-i} + \varepsilon_t.$$

where $\phi_1, \ldots, \phi_p$ are parameters, c is a constant, and the random variable $\epsilon_t$ is white noise. An autoregressive model is essentially an all-pole infinite impulse response filter with some additional interpretation placed on it. Some constraints may be necessary on the values of the parameters so that the model can remain stationary. For example, processes in the AR(1) model with $|\phi 1| \geq 1$ may not be stationary.

The Moving Average Model, MA(q), can be defined as the moving average model of order q:

$$X_t = \mu + \varepsilon_t + \sum_{i=1}^{q} \theta_i \varepsilon_{t-i}$$

where the $\theta_1, \ldots, \theta_q$ are the parameters of the model, $\mu$ is the expectation of $X_t$ (which may be assumed to equal 0), and the $\epsilon_t, \epsilon_{t-1}, \ldots$ are white noise error terms. The moving-average model can be a finite impulse response filter with additional interpretation placed on it.

The ARMA(p, q) can be defined as the model with p autoregressive terms and q moving-average terms. This model can contain the AR(p) and MA(q) models:

$$X_t = c + \varepsilon_t + \sum_{i=1}^{p} \varphi_i X_{t-i} + \sum_{i=1}^{q} \theta_i \varepsilon_{t-i}.$$

In some embodiments, the tunnel re-route frequency can be calculated using a Periodic Auto-Regressive Moving Average ("PARMA") model. For example, the PARMA model comprising estimating the average number of re-routes using a finite approximation based on a predetermined number of most recent observations.

At 206, the tunnel re-route frequency can be compared to a frequency threshold. At 208, it can be determined if the tunnel re-route frequency exceeds the frequency threshold. At 210, at least one tunnel re-route can be delayed if the tunnel re-route frequency exceeds the frequency threshold. In some embodiments, the at least one tunnel re-route can be delayed using an exponential back-off timer. For example, the exponential back-off timer duration can be derived as a function of a re-route dampening factor, e.g., 0<F<1. In some embodiments, the value of the re-route dampening factor can be tuned. For example, the factor can be tuned to reduce tunnel flapping.

Figure 3:
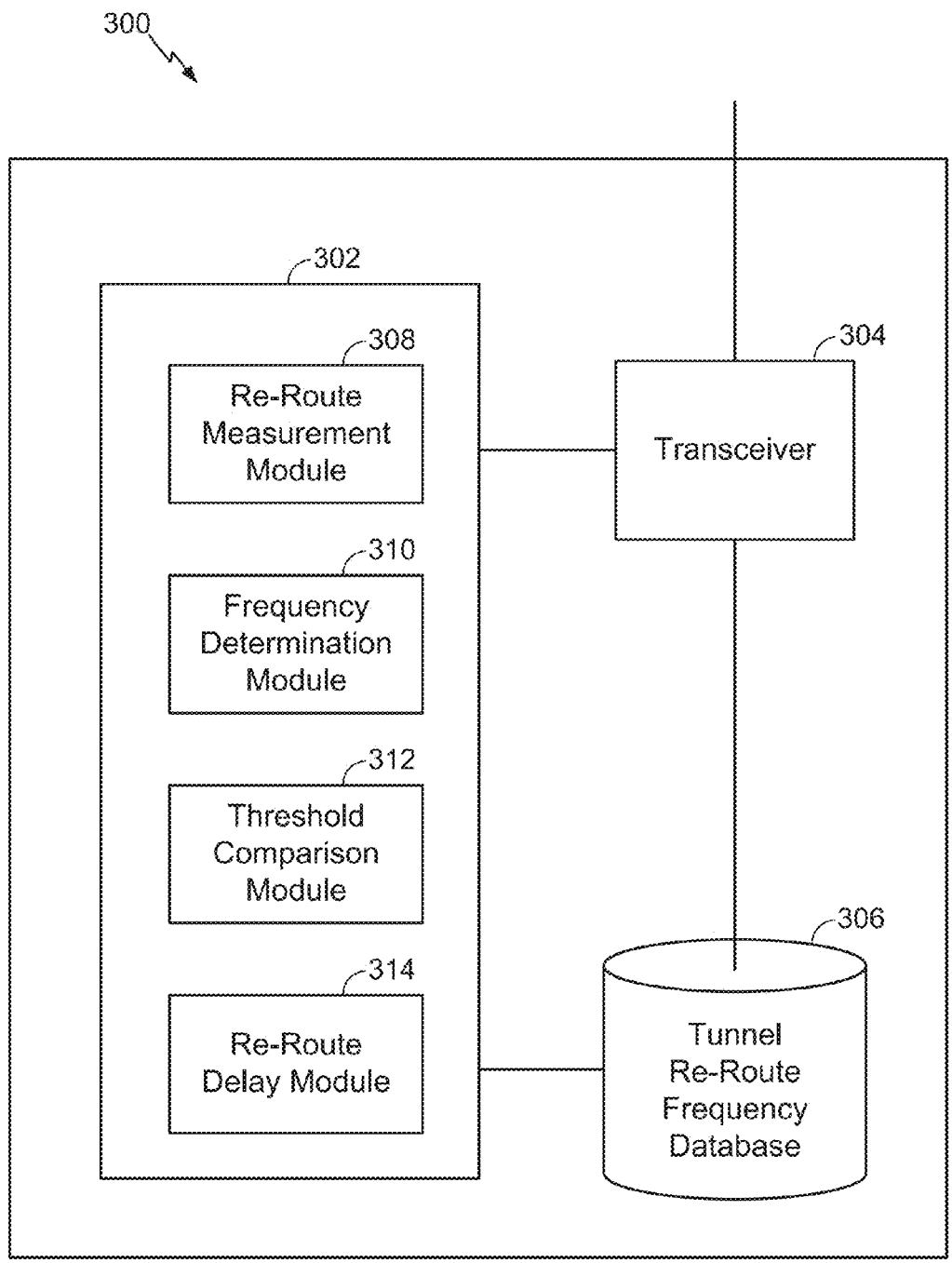
FIG. 3 illustrates a head-end router configured to dampen tunnel flapping in traffic engineered networks.

FIG. 3 illustrates a head-end router 300 configured to dampen tunnel flapping in traffic engineered networks. The head-end router 300 can include a processor 302, a transceiver 304, and a tunnel re-route frequency database 306.

The processor in FIG. 3 shows at least four modules: a re-route measurement module 308; a frequency determination module 310; a threshold comparison module 312; and a re-route delay module 314. The re-route measurement module 308 can measure a number of policy-based re-routes during at least one measurement interval. The frequency determination module 310 can determine a tunnel re-route frequency based on the measurement. The threshold comparison module 312 compares the tunnel re-route frequency to a frequency threshold. The re-route delay module 314 delays the at least one tunnel re-route if the tunnel re-route frequency exceeds the frequency threshold.

One embodiment will now be described that includes a mechanism to track the reroute history of MPLS & GMPLS tunnels at the head-end routers over configured measurement intervals. The reroute history can be defined as the number of policy based re-routes during the measurement interval, or a cumulative average number of re-routes during each recurring measurement interval. Excessive re-route may be controlled via a configurable threshold, and an exponential back-off timer. The exponential back-off timer duration is derived as a function of a re-route dampening factor (0<F<1). With the tunnel re-route frequency is dampened using an exponential back-off timer, the tunnel flapping due to policy based re-routing can be reduced by tuning the value of dampening factor parameter (F).

One exemplary method will now be described. The method facilitates optimal utilization of resources in the traffic engineered networks by eliminating or minimizing the tunnel flapping in the traffic engineered networks. By eliminating or minimizing Tunnel flapping the overhead of frequent and redundant tunnel re-routes can be minimized, which in turn results in minimization of:

Disturbances in the stability of the network resources.
Fluctuation of throughputs across the network.
Unnecessary overhead of signaling message processing in control plane processors.
Link B/W consumption and traffic congestion competing against the resources meant for SLA satisfying customer traffic.

The mechanism enables the TE networks to monitor any indication of excessive and repetitive Tunnel re-routes in real time and applies a re-route dampening procedure to eliminate the chances of Tunnel flapping to occur.

The method can be used to protect resources in the traffic engineered networks to maintain the SLA agreements against existing MPLS/GMPLS tunnels and also to predict availability of resources for new tunnel provisioning with specific resource/SLA requirements. This allows a method of achieving fine grained optimization of path(s) used by dynamic RSVP-TE & GMPLS-RSVP-TE signaled tunnels.

The method prevents undesirable network traffic disturbances and unnecessary fluctuations of allocation/de-allocation of TE-Link resources due to Tunnel flapping under conflicting network and/or Tunnel's path policy. The method attempts to minimize scaling or performance overhead due to Tunnel flapping, by dampening the tunnel re-route frequency using exponential back-off mechanism. The method does not impose any additional security threats other than those already applicable for RSVP-TE & GMPLS-RSVP-TE signaling protocols.

This method will be useful for markets where MPLS/GMPLS based dynamic traffic engineered transport services will be deployed. The method will facilitate a robust and reliable re-optimization of TE-Link resources and Tunnel's paths, against multiple different network policies and per-tunnel policies in effect across different parts of the traffic engineered networks. The method will work in those parts of MPLS S/W architecture, where traffic engineering policy is applied and tunnel re-route decision making is performed.

The method can be used to only influence the algorithmic re-optimization or re-route decision making of the MPLS/GMPLS Tunnels at the ingress nodes. Since the method does not require any change in the re-route signaling protocols of RVSP-TE (RFC3209) or GMPLS-RSVP-TE (RFC3473), no interoperability issues against standard based MPLS/GMPLS solutions are foreseen.

The method improves:

Overall performance, reliability and availability of traffic engineered MPLS/GMPLS transport services;
Overall utilization of the resources in the traffic engineered networks;

Provisioning and maintenance of traffic engineered MPLS/GMPLS tunnels in a predictable manner;

Reliability and availability of traffic engineered MPLS/GMPLS transport tunneling services; and Efficient/optimum utilization of network resources under the constraints of multiple different traffic engineering policies that might be imposed in the network by services providers & network operators.

One aspect of the invention will now be described for [G]MPLS Tunnel Flap Control in Self Optimizing Networks. In the present MPLS/GMPLS Traffic Engineered network, the routers and switches are either manually configured or partially automatically provisioned with many network management activities are still manually performed. Manual provisioning is time consuming and error prone and often requires expert technician for troubleshooting and network re-optimization decision making.

Network configuration, integration, fault management, expansion, planning, commissioning and forecasting are important for reliable and robust network operations. The manual provisioning and manual maintenance processes of network topologies may not be capable of responding to network events in real time and also not capable of re-optimizing network performance during changing network traffic dynamics and changing network topologies, which results in sub-optimal network performance, throughput, and sub-optimal return on investment (ROI) for the service providers and network operators.

Due to continuously increasing demand of traffic volume and network growth in data centers, cloud services and deployment of interconnected data centers with more and more virtualized server based data services introduction, optimal and efficient usage of interconnecting MPLS/GMPLS traffic engineered networks, becomes critically important. These ever increasing growing demand of operational efficiency and performance optimization necessitates a smarter way of managing and maintaining MPLS/GMPLS traffic engineering networks via self re-organization of network topologies and self re-optimization of network performances and capabilities.

Figure 4:
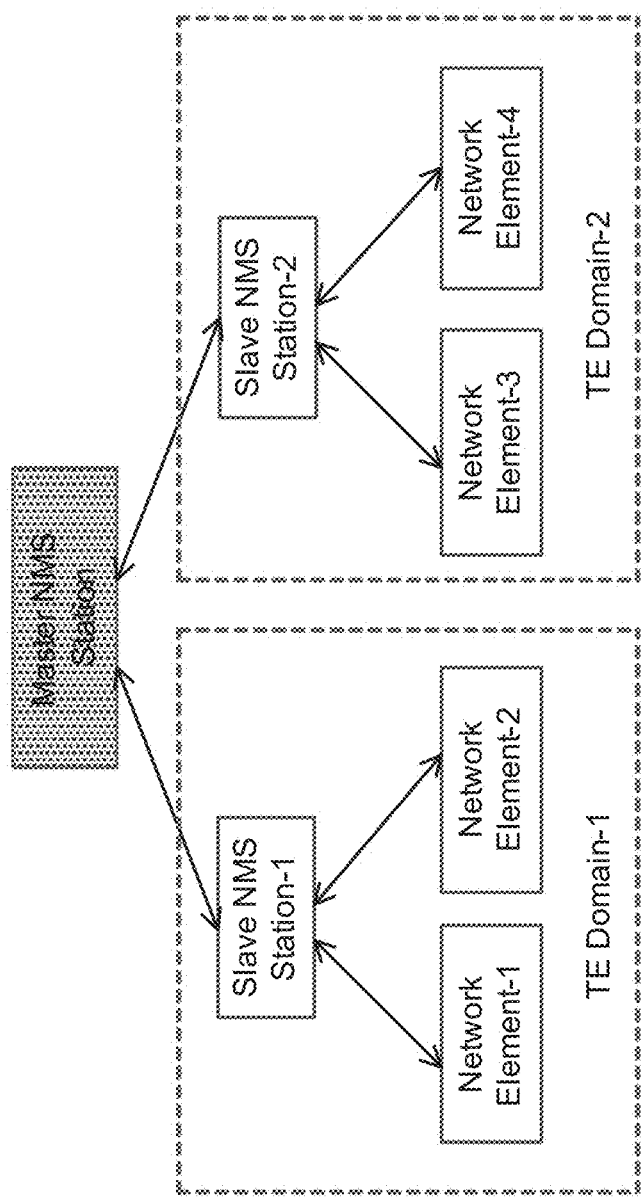
FIG. 4 illustrates an exemplary centralized network architecture according to one embodiment of the invention.

Self Optimizing Network Architecture for a centralized network according to one embodiment of the invention will now be described. As shown in FIG. 4, the centralized architecture, the network provisioning/de-provisioning control lies outside the switching network elements. A single controller entity, usually the 'Network Management System' (NMS), is responsible for provisioning and maintaining the configuration and status of all the switches in the entire TE domain. The NMS would interact with the switches via North-Bound interfaces, usually CLI, SNMP-Agent or XM-Agent.

In a multi-technology environment, the NMS station and the network elements may be from different vendor and may use different North-bound interfaces, which may lead to inter-operability issues. Due to single point of provisioning control, the performance of configuration provisioning on the network elements would be slower by an order of magnitude.

In the centralized architecture, various algorithms used for load balancing MPLS/GMPLS Tunnels and L2-VPN Pseudo-wires would reside inside the NMS system. A NMS system internally may contain a path computation client which utilizes the services of an external path computation server responsible for running algorithm engine.

FIG. 4 shows a centralized [G]MPLS network architecture consisting of multiple TE domains with network elements containing embedded network management software support. In FIG. 4:

TE-Domain-1 & TE-Domain-2→[G]MPLS Traffic Engineering domains;

Master-NMS Station→Master Network Management station;

Slave-NMS Station-1→Controls Network Element(s) in TE Domain-1;

Slave-NMS Station-2→Controls Network Element(s) in TE Domain-2;

Network Element-1, Network Element-2→[G]MPLS Router/Switches in TE Domain-1; and Network Element-3, Network Element-4→[G]MPLS Router/Switches in TE Domain-2.

A Distributed Network Architecture according to one embodiment will now be described. In the distributed architecture, the network provisioning/de-provisioning control is not limited to an external NMS station. In this architecture the TE routing/switching nodes will run IGP (OSPF, IS-IS) and BGP routing protocols for network path discovery and network resource availability distribution among themselves.

The TE routing/switching nodes may also have embedded network management which is required for minimum network provisioning, however majority of network traffic engineering functions e.g. network reach-ability, network load balancing, load distribution, network re-optimization etc. are dynamically handled by the combination of dynamic routing, signaling and path computation services.

The dynamic routing and signaling functions are available as embedded control plane inside the routing/switching nodes in the TE network. The TE path computation services are often leveraged from dedicated PCE servers in the TE networks. The PCE based path computation services function in a distributed client/server architecture.

In this architecture the [G]MPLS routing/switching nodes run the 'Path Computation Client (PCC)', which request path computation services from one or more 'Path Computation Server (PCS)' in the TE domains. The PCS nodes learn the traffic engineering topology graph and traffic engineering resource availabilities by listening to the OSPF-TE/GMPLS-OSPF-TE and ISIS-TE/GMPLS-ISIS-TE Link state advertisements in the TE domain.

The MPLS/GMPLS Routing/Switching nodes which run OSPF-TE/GMPLS-OSPF-TE and ISIS-TE/GMPLS-ISIS-TE protocol extensions will flood the TE Link state advertisements, whenever the TE network reach-ability or TE network resource availability changes due to network events or tunnel's resource reservation changes. When a [G]MPLS Tunnel spans multiple TE domains, the end-to-end Tunnel's constrained path is obtained as a concatenation of individual TE domains path segments computed by the domain specific PCS(s).

For example, assuming an inter-domain TE Tunnel needs to be established across a sequence of TE domains, viz. D1, D2, D3, . . . Dm−1, Dm. Also assume there are PCE servers PCS1, PCS2, PCS3, . . . PCSm−1, PCSm in those TE domains respectively, who will compute the per-domain path segments PSG1, PSG2, PSG3, . . . PSGm−1, PSGm, in a collaborative manner. Then the end-to-end path of the inter-domain TE tunnel would be a concatenation of the individual per-domain path segments, i.e, PSG1→PSG2→PSG3→ . . . → PSGm−1→PSGm.

Figure 5:
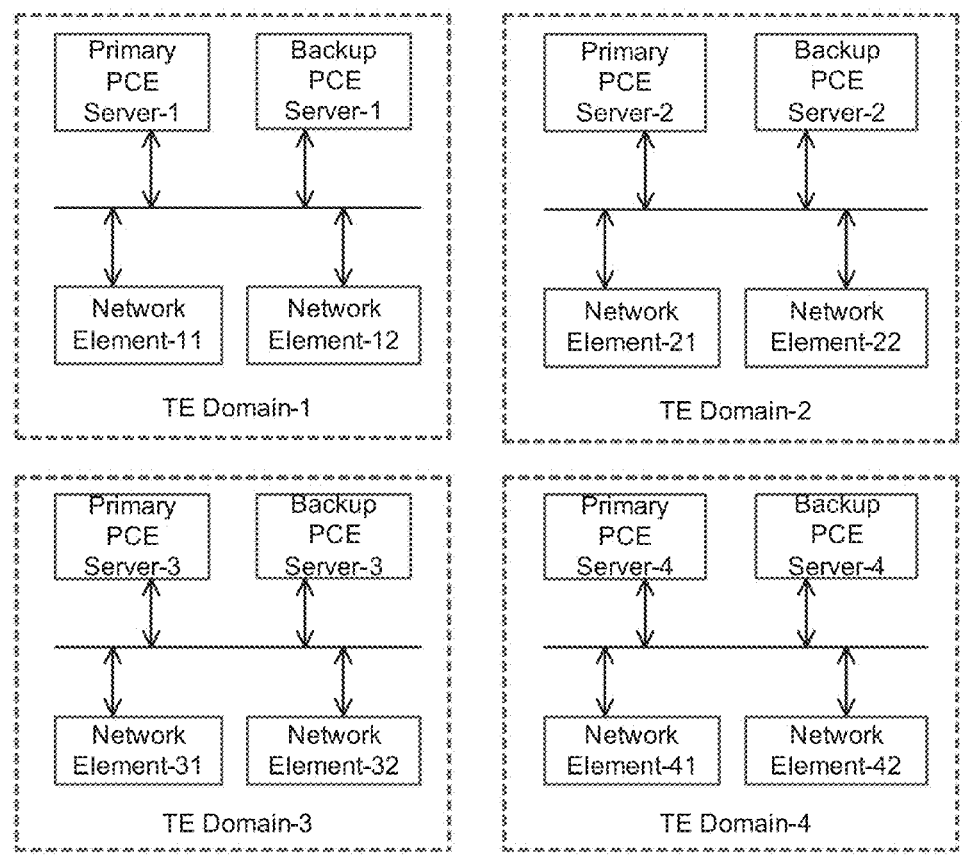
FIG. 5 illustrates an exemplary distributed network architecture according to one embodiment of the invention.

FIG. 5 shows an exemplary distributed [G]MPLS network architecture consisting of multiple TE domains with network elements containing embedded network management software support. In FIG. 5:

TE-Domain-j, $1 \leq j \leq 4 \rightarrow$[G]MPLS Traffic Engineering domains;

Primary PCE Server-j, $1 \leq j \leq 4 \rightarrow$Primary PCE Server in TE-Domain-j;

Backup PCE Server-j, $1 \leq j \leq 4 \rightarrow$Backup PCE Server in TE-Domain-j; and Network Element-j1, Network Element-j2, $1 \leq j \leq 4 \rightarrow$[G]MPLS Router/Switches in TE Domain-j.

Tunnel Path Computation Servers according to an exemplary embodiment will now be described. The path computation algorithm engine either inside the NMS station or in the dedicated PCE server, would typically be capable of running several combinatorial optimization algorithms, for calculating optimal paths for the transport tunnels. The algorithm suites may include, but not limited to the following classes of optimization algorithms:

Constrained shortest path first for Link or node disjoint path pair;

Constrained shortest path first for a set of 'K' Link or Node or SRLG disjoint paths (K>2);

Ant colony based heuristics optimization algorithms;

Multi-objective evolutionary optimization algorithms; and

Statistical and Machine learning Algorithms.

Centralized Network Optimization Results Provisioning according to an exemplary embodiment will now be described. The resulting output of various optimization algorithm computations are forwarded from NMS system to the network elements for applying against the network operations. In a centralized architectures it's possible to run simulated experiments against an instantaneous snapshot of TE network domain(s) to observe the impact of network parameter optimization results, before actually applying the parameter changes on the network elements.

The latency of collecting statistical data from network elements and sending those to the NMS system for processing is usually much higher in the case of centralized controller architecture. To alleviate this latency certain policy rules may be installed on the network elements so that collected statistical data is reported to NMS system much less frequently or at longer periodic time intervals.

Distributed Network Optimization Results Provisioning according to an exemplary embodiment will now be described. In the case of distributed architecture the path optimization algorithmic computations will run against the TE topology databases held inside the TE domain PCE servers. The results of such path optimization calculations will be returned to the routing/switching nodes, which will then establish new TE tunnels or reroute existing TE tunnels along the newly computed optimal paths.

Centralized Network Architecture Scaling and Performance according to an exemplary embodiment will now be described. A centralized NMS system presents a performance bottleneck, when there are several network elements in a single TE domain. To maintain the provisioning response time and statistical data reporting load to a pre-defined upper limit, TE domains should be partition-able into multiple smaller sized domains. However smaller domains produced as a result of partitioning a larger TE domain would be under the control of same policy constraints and administrative security as the parent TE domain.

A single NMS system may not be able to handle the periodic status data polling and report receiving from a number of network elements beyond a certain count. In such scenarios, the centralized architecture may deploy NMS systems in a hierarchical manner. In other words a single EMS system may control a small subset of TE domains which are under the control of same administrative domain.

These subset of TE domains under the same EMS system would form a closed user group (NE-CUG). Similarly a group of EMS systems would be controlled at a higher layer by a single NMS system. These EMS group would from a closed user group, viz. (EMS-CUG). When there are several hundreds of TE domains, a single NMS with 2 level of hierarchies may still not be good for scaling. In such scenarios a group of NMS systems would form a closed user group (CUG), viz. slave NMS CUG (S-NMS-CUG). A higher level NMS system, termed as Master NMS (M-NMS) would control the S-NMS-CUG.

Distributed Network Architecture Scaling and Performance according to an exemplary embodiment will now be described. In the case of distributed network architecture the size of the TE domain is determined by the number of [G]MPLS routing/switching nodes are present. To maintain the OSPF-TE or ISIS-TE network convergence time and routing/signaling control protocol processing overhead and statistical network load measurement/reporting to a pre-defined upper limit, TE domains should be partition-able into multiple smaller sized domains.

The smaller TE domains produced as a result of partitioning a larger TE domain would have their own PCE servers and would run under the control of same policy constraints and administrative security as the parent TE domain. The PCE servers in individual TE domains would be responsible for handling path computation requests and running optimization algorithms for their respective domains. When there are several TE domains under a single administrative domain, a hierarchical TE domain architecture can be formulated. In such framework a PCE server in a higher layer TE domain will be able to utilize the path computation services of a lower layer PCE Server. The PCE servers at a single layer of hierarchy would form a closed user group (PCE-CUG). In a PCE-CUG, all members of the same CUG can communicate with each other.

Centralized Network Architecture Failure and Redundancy according to an exemplary embodiment will now be described. A centralized NMS system presents a bottleneck of single point of failure, any outage of the centralized NMS system or centralized path computation server may result in the stale values of optimization results being used in the TE domain. Such stale values of configuration and control parameters may lead to sub-optimal network performance or sometimes inconsistent or invalid transport tunnel paths being used in the TE domain for a longer duration in the case of centralized architecture than is possible in the case of a distributed architecture.

To handle the single point of failure the EMS systems may be deployed in (N+1) redundancies in the form of a cluster. Among the member EMS systems, a priority based selection strategy may be used to choose the highest priory EMS system as the designated EMS which will be primary active system controlling the NE-CUG. Other non-designated EMS members of the cluster will be in a standby state and will periodically synchronize state updates from the designated primary EMS system.

When the current designated primary EMS system fails, the next highest priority EMS system among the standby members, would be selected as designated primary. As the designated primary member continues to fail, the next highest priority standby member continues to be selected as new designated primary member, until all the standby members in the cluster are exhausted.

Distributed Network Architecture Failure and Redundancy according to an exemplary embodiment will now be described. In the distributed network architecture, the PCE server in a TE domain presents a bottleneck of single point of failure. Any outage of the PCE server may result in the stale values of optimization results being used in the TE domain, leading to sub-optimal network performance or sometimes inconsistent or invalid transport tunnel paths.

To handle the single point of failure the PCE servers in a TE domain may be deployed in (N+1) redundancies in the form of a cluster. Among the member PCE servers, a priority based selection strategy may be used to choose the highest priory available PCE server as the designated primary PCS, for handling path computation requests from [G]MPLS Routing/Switching nodes. Other lower priority PCE servers in the cluster will be in a standby state and will periodically synchronize state updates from the designated primary PCE server.

When the current designated primary PCE server fails, the next highest priority PCE server among the standby members, would be selected as designated primary. As the designated primary member continues to fail, the next highest priority standby member continues to be selected as new designated primary member, until all the standby members in the cluster are exhausted.

Network Optimization Scheduling according to an exemplary embodiment will now be described. In the G[MPLS] TE domain, the effectiveness of parameter optimization depends on the frequency of applying optimization results and the frequency of data collections. The effectiveness can be controlled by the parameters explained in the subsequent sub-sections.

Statistics data collection frequency according to an exemplary embodiment will now be described. How frequently the statistics parameters are collected from the network elements and reported to NMS by the EMS system. This parameter also determines how often statistical data analysis can be performed by the EMS or NMS system. In the case of distributed architecture, the statistics parameters are reported to PCE via IGP-TE (OSPF-TE or ISIS-TE) TE LSA advertisement extensions.

The statistical parameters analysis and optimization calculation will be done by the PCE servers.

Statistical data analysis frequency according to an exemplary embodiment will now be described. How frequently the collected statistical data is analyzed, by running a decision process to adjust the control parameters of the network elements. To make a precise decision about the impact of a collected parameter data, a history of periodically collected data should be averaged smoothly. Averaging over a history of periodically collected data helps in determining the long term behavior of a parameter as opposed to short term variations of the parameter. An Autoregressive Moving Average (ARMA) statistical model would be suitable for more accurately calculating the periodic average values of a statistical data.

Parameter change frequency according to an exemplary embodiment will now be described. How frequently the statistical parameter changes as calculated, using the ARMA model are applied by the EMS system on the network elements. Depending on the scaling and performance limit of the EMS system, the parameter change may applied to only a smaller sub-set of the members in the NE-CUG. Thus an EMS system may be required to schedule the parameter changes in a selective order to apply to the members of the NE-CUG in multiple stages. Also the frequency of applying parameter changes may run independent of parameter collection frequencies. In the case of distributed network architecture, the statistics parameters change are reflected as extended traffic engineering metric change against the tunnel's paths. The application of statistical parameter changes is achieved in terms of constrained optimal path calculation and other factors.

[G]MPLS Tunnel Flap Control via Network Load Balancing according to an exemplary embodiment will now be described. In MPLS/GMPLS traffic engineered networks, the network load balancing is achieved via periodic monitoring and measurement of various transport tunnel's traffic load and subsequent re-optimization of tunnel's path in order to distribute the traffic load, so as to optimally utilize the traffic engineering resources of the network topology.

In order to distribute the load the transport tunnels are optimally distributed inside the TE domains. Inside a TE domain, similar network elements are expected to share the load of MPLS/GMPLS tunnels, destined to the same egress LER. The MPLS/GMPLS tunnels are re-optimized under policy control to meet the traffic engineering goals of tunneling services. The policy controlled re-optimization involve re-computation of Tunnel's path and re-route/re-signal the Tunnel along the newly found more optimal path through the network.

Network Load Measurement according to an exemplary embodiment will now be described. In traffic engineered networks, the network load can be measured by tracking the per-Tunnel traffic flow or aggregated traffic flows of multiple tunnels. In order to track the traffic flows, the MPLS/GMPLS tunnel specific traffic should be classified as flows and traffic metering can be applied at various points of observation in the TE domain, to measure actual traffic flow rates, though in the case of dynamically signaled RSVP-TE tunnels, the flow specification and traffic specification will be known during end-to-end signaling session establishment.

Centralized Load Measurement according to an exemplary embodiment will now be described. In this method each ingress router in the TE domain monitor the traffic load of the Tunnels over a configurable period of time interval and sends a summarized load report to a centralized NMS station for processing. The transit routers of the TE domain also monitor traffic load of the crossing tunnels and generate summary load report to be sent to the central NMS station.

In the case of inter-domain Tunnels, each TE domain or a subset of TE domains that belong to the same administrative domain may be controlled by a single NMS station. In such scenarios a single NMS system will have the knowledge of Tunnel traffic load of only a subset of TE domains and load balancing done based on the load reports of such local domain sub-set would be optimal w.r.t. the domain sub-set, but may not be globally optimal for the end-to-end tunnel path(s).

Distributed Load Measurement according to an exemplary embodiment will now be described. In this method each of the TE router(s) in a TE-domain monitor the traffic load of the Tunnels over a configurable period of time interval and distributes a summarized load report to other TE routers by using an extension of OSPF-TE traffic engineering link state advertisements. The transit routers of the TE domain also monitor traffic load of the crossing tunnels advertise via OSPF-TE or ISIS-TE LSA advertisement extension.

Network Load Re-distribution according to an exemplary embodiment will now be described. In MPLS/GMPLS traffic engineered networks, the load distribution refers to how the transport tunnels are distributed inside the TE domains. Inside a TE domain, similar network elements are expected to share the load of MPLS/GMPLS tunnels, destined to the same egress LER. In the case of Inter-Domain Tunnels that traverse sequence of TE-domain(s), the act of load balancing would be to distribute Tunnels across multiple alternate TE-domains. Path(s).

An inter-domain path Pj={D1, Dj1, Dj2, Dj3, . . . Djm, Dn}, j=k, k+1, k+2, . . . k+r, refers to a sequence of path segments, with each segment traversing through a domain 'Dr', i.e. Pj:—D1→Dj1→Dj2→Dj3→ . . . Djm→Djn.

Thus if a set of Tunnels TS={T1, T2, T3, . . . TN} can all reach a common destination LER-d in a TE domain 'Dn' from a source TE domain 'D1' using any of the inter-domain TE paths Pj={D1, Dj1, Dj2, Dj3, . . . Djm, Dn}, j=k, k+1, k+2, . . . k+r, then the tunnel set TS can be sub-divided into smaller subsets of Tunnels, TSx, TSx+1, TSx+2, . . . TSx+z, based on load balancing policies, such that each of the Tunnel subsets TSy can be setup/rerouted over the inter-domain path Py={D1, Dy1, Dy2, Dy3, . . . Dym, Dn}.

Thus when the load increases, a set of tunnels based on policy can be re-routed to go over alternate sequence of transit TE domains, to reduce the load and increase the system capacity on the individual network elements. In other words, different class of real-time load balancing algorithms can be run simultaneously to provide different degrees of dynamic load balancing of user traffic through the TE network.

Additionally long term behaviors of various classes of traffic can be monitored in the network elements, and based on the history of traffic patterns, selected traffic flows can be re-directed by a NMS system to follow pre-defined paths of TE nodes inside a TE-domain or domain sequences in the case of inter-Domain paths.

The criterion to be used as input for load balancing of Tunnels across TE domains can be enumerated hereafter. The policy controlled re-optimization involve re-computation of Tunnel's path and re-route/re-signal the Tunnel along the newly found more optimal path through the network.

[G]MPLS Tunnel Flap Control via Network Re-Optimization according to an exemplary embodiment will now be described. In traffic engineered networks, the MPLS/GMPLS tunnels are often re-optimized under policy control to meet the traffic engineering goals of tunneling services and also to optimally utilize the traffic engineering resources of the network topology. The policy controlled re-optimization involve re-computation of Tunnel's path and re-route/re-signal the Tunnel along the newly found more optimal path through the network.

The need for tunnel re-optimization is a reactive response to various events occurring in the traffic engineering networks. In a traffic engineering network, a network event (NET-Event) may be distinguished from a Traffic Engineering event (TE-Event). Network events are the results of following types of changes in the network dynamics:

Link or router failures that trigger the generation of IGP-TE Link properties advertisements. Such advertisements convey the unavailability of one or more TE capable links, which may trigger reroute of existing tunnels traversing the path; and Link or router recoveries that trigger the generation of IGP-TE Link properties advertisements, which convey the availability of one or more TE capable links, that can be used to reach certain destinations through the advertising neighbor.

Traffic engineering events are the results of following types of changes in the network dynamics:—

Tunnel signaling setup failure due to admission control of TE resources in the domain;

Tunnel signaling release and tear down due to traffic engineering pre-emption policies;

New Tunnel establishments that would trigger the generation of IGP-TE Link properties advertisements indicating updated TE Link resource properties. Such advertisements indicate sub-optimal Link resources availability and may cause reroute for one or more tunnels;

Existing Tunnel tear down that would trigger the generation of IGP-TE Link properties advertisements indicating updated TE Link resource properties. Such advertisements indicate more Link resources and availability of alternate better, and may cause reroute for one or more tunnels;

New TE Re-optimization Policy is advertised via policy server (e.g. COPS); and

Existing TE Re-optimization Policy is withdrawn via policy server.

Tunnel Flap Control for Protection Tunnels according to an exemplary embodiment will now be described. In traffic engineered networks, an important characteristics is to provide protection for the [G]MPLS tunnels against network failure, using backup/secondary tunnels. In the case of MPLS tunnels, two methods of failure protection and fast rerouting using RSVP-TE protocol extensions are described. These two methods are:

Protection via detour backup tunnels (1:1 protection)—A dedicate backup tunnel for each primary tunnel at specific LSRs, which function as point of local repair (PLR); and Protection via facility backup tunnels (1:N protection)—A shared bypass tunnel that can carry the backup LSPs for 'N' number of different primary tunnels.

Detour Backup Tunnel Flapping according to an exemplary embodiment will now be described. A detour backup LSP may get pre-empted by the signaling setup of another higher priority Tunnel following the same path due to admission control policies. The pre-emotion of the detour backup LSP would render the primary LSP unprotected at the PLR. In order to avoid maintaining the tunnel unprotected, the PLR node may attempt to re-compute a new constrained path (link or node disjoint with primary) and re-route the detour backup. This will make the primary LSP protected again at that PLR. However if the detour LSP repeatedly gets pre-empted and rerouted along the new alternate paths, due to other higher priority LSP signaling setup, then it causes a reroute flapping detour LSP.

Depending on the network topology and available TE resources, a detour backup LSP may be created at a PLR, even if the bandwidth guarantee requested by the primary LSP, can't be met along the detour backup LSP's path. In such scenarios the detour backup LSP would be considered as sub-optimal and the PLR node may under a policy control, periodically re-route the detour backup LSP, for traffic engineering re-optimization. Depending on the frequency of re-routing due to network re-optimization, the detour LSP may be re-route flapping.

Facility Backup Tunnel Flapping according to an exemplary embodiment will now be described. The facility backup tunnels provide a more economic way of tunnel protection, since those are carried through an outer bypass tunnel, thus not exposing their RSVP-TE signaling states at the intermediate nodes between the PLR and the MP nodes. A facility backup LSP may not be signaled through a bypass tunnel, until the protection repair has been triggered after a failure of the primary LSP. However a facility backup LSP may get pre-empted by the signaling setup of another higher priority facility backup which needs to traverse the same bypass tunnel. The pre-emption is triggered due to admission control policies at the PLR.

The pre-emotion of the facility backup LSP would render the primary LSP unprotected at the PLR. Thus to avoid, maintaining the primary LSP unprotected, the PLR node may attempt to find another suitable Bypass tunnel, through which the new facility backup LSP would be rerouted to make the primary LSP protected again at that PLR. However if the facility backup LSP repeatedly gets pre-empted and rerouted through new Bypass tunnels, due to other higher priority facility backup LSP signaling setup, then it causes a reroute flapping of the facility backup LSP.

Depending on the network topology and available TE resources, a facility backup LSP may be signaled through a Bypass tunnel at a PLR, even if the bandwidth guarantee requested by the primary LSP can't be met through that Bypass tunnel.

In such scenarios the facility backup LSP would be considered as sub-optimal and the PLR node may under a policy control, periodically re-route the facility backup LSP, for traffic engineering re-optimization purposes. Depending on the frequency of re-routing due to network re-optimization, the facility backup LSP may be re-route flapping.

For example, assume the following:
There are 'N' number of primary LSP(s), P-LSP(1), P-LSP(2), P-LSP(3), . . . P-LSP(N).
The 'N' primary LSPs traverse LSP path(s) LSR $(1,j) \rightarrow LSR(2,j) \rightarrow LSR(p) \rightarrow LSR(p+1,j) \rightarrow LSR(p+2,j) \rightarrow LSR(q-2,j) \rightarrow LSR(q-1,j) \rightarrow LSR(q) \rightarrow LSR(3,j) \rightarrow LSR(4,j)$ $[1 \leq j \leq N]$.
The Primary LSP 'P-LSP(j)' $1 \leq j \leq N$, has a bandwidth capacity of PC(j) Mbps, holding priority of H(j) and setup priority of S(j) respectively.
The path segments of the primary LSP(s) between the two common LSR(s), LSR(p) and LSR(q) respectively, need to be protected using Bypass Tunnel mechanism.
There are 'M' Bypass Tunnels between the LSR(s), LSR (p) and LSR(q), which traverse paths that are node diverse with the primary LSP(s) common path segment.
The Bypass Tunnel 'B-TUN(j)' $1 \leq j \leq M$, traverses a node diverse path layout $LSR(p) \rightarrow LSR(j,k1) \rightarrow LSR(j,k2) \rightarrow \ldots LSR(j, k(t-1)) \rightarrow LSR(j, km) \rightarrow LSR(q)$.
The Bypass Tunnel 'B-TUN(j)' $1 \leq j \leq M$, has a bandwidth capacity of BC(j) Mbps.
The LSR(p) plays the role of Point-of-Local Repair (PLR) and LSR(q) plays the role of Merge Point (MP).
Primary LSP(s) 'P-LSP(x, y)' $1 \leq y \leq R(x)$ are protected by a Bypass Tunnel 'B-TUN(x)' $1 \leq x \leq M$, [such that $\Sigma R(x)$, $1 \leq x \leq M = N$].

Also assume that after some of the links or nodes went down, along the primary LSP's paths between the PLR and MP nodes, i.e. LSR(p) and LSR(q), a number of primary LSPs would be repaired, by rerouting the traffic through bypass tunnels at PLR node. Let's also assume that the repair causes all the Bypass tunnels to carry the traffic of some number of primary LSP(s). And also assume that as a part of repair or re-optimization trigger:
The PLR node signals a higher priority Facility Backup LSP 'FB(p1)' through Bypass Tunnel 'B-TUN(1)' which causes a preemption of another lower priority Facility Backup LSP 'FB(p2)' out of 'B-TUN(1)'
The PLR node then due to optimal computation and bandwidth resource accounting, reroutes the preempted Facility Backup LSP 'FB(p2)' through Bypass Tunnel 'B-TUN(2)', which causes a preemption of another lower priority Facility Backup LSP 'FB(p3)' out of 'B-TUN(2)'
The PLR node then due to optimal computation and bandwidth resource accounting, reroutes the preempted Facility Backup LSP 'FB(p3)' through Bypass Tunnel 'B-TUN(3)', which causes a preemption of another lower priority Facility Backup LSP 'FB(p4)' out of 'B-TUN(3)'.
This process of LSP pre-emption goes on, until the last Bypass Tunnel 'B-TUN(M)' is reached.

End-To-End Backup Tunnel Flapping according to an exemplary embodiment will now be described. In a GMPLS traffic engineering network, when a primary LSP is protected end-to-end (E2E), the protecting backup LSP traverses a path from the head-end LER up to the tail-end LER. The backup LSP would usually follow a diversely routed path that is either link-disjoint, node-disjoint or SRLG-disjoint with the primary LSP's path. When the E2E backup LSP's path does not satisfy all the TE constraints, the backup LSP is considered sub-optimal and needs to be re-optimized based on the applicable TE policies.

But if this re-optimization causes pre-emption or rerouting of one or more other LSPs, then there would be disturbance in the network, since each LSP reroute via Make-before-Break would mean setup of a new optimal LSP and destroy the old sub-optimal LSP. However such procedures would cause many IGP-TE LSA(s) to be advertised in the network more frequently, which may lead to network congestion and/or overloading of the TE LER/LSR nodes. Also depending on the topology graph of the TE network domain, attempt to optimize a backup LSP path in isolation may still result in a sub-optimal LSP path, which may require further optimization in subsequent time intervals and LSP reroute. However a joint optimization of the primary and backup LSP path pair, would yield more optimal path(s), requiring less frequent rerouting. If the LSP reroute frequency exceeds a configured upper threshold, then reroute should be dampened, i.e. delayed to avoid tunnel flapping.

Segment Backup Tunnel Flapping according to an exemplary embodiment will now be described. Since during Network failure or network recovery event (NET-Event) TE Link resource properties change, Tunnel re-optimization policy may require tunnel to be re-routed over an alternate optimal path. Also due to TE-Event a Tunnel may require re-signaling and establishment over a new feasible path. Alternately the path of an existing Tunnel may become sub-optimal due to one or more TE-Event(s).

In either case Tunnel re-routing requires new optimal path computation and signaling re-establishment over the newly found path.

Shared Mesh Restoration (M:N) Tunnel Flapping according to an exemplary embodiment will now be described. In the case of a shared mesh restoration scheme, 'M' number of primary LSP's paths between two common LSR nodes, are protected by 'N' number of backup/protection LSPs, where M>N. During a network failure, one or more primary LSPs may go down, which are restored by rerouting traffic of the failed LSPs onto the backup LSPs. Since this method of shared protection is more economic, i.e. uses less number backup LSP resources, it may not be possible to restore all of the failed primary LSPs. Only the higher priority LSPs would be restored by rerouting the traffic from the failed primary onto the backup LSP path. Also even if failed primary LSP was repaired using a backup LSP before, a newly failed primary LSP that is of higher priority would pre-empt the lower priority restored primary to reuse it's backup LSP.

The pre-empted primary LSP would have to be again rerouted by finding alternate path. If the rerouted alternate path happens to be another shared mesh restoration path, then upon a common network link or node failure, many primary LSPs would require restoration and only higher priority primary LSPs would be restored. The lower priority LSPs would either be not restored or be pre-empted by higher priority primary LSPs after a initial restoration.

Similarly after a network recovery, i.e. failed node or link becoming operational again, IGP routed network and traffic engineering resources would re-converge, and traffic engineering policies would trigger TE network resource re-optimization, by re-routing some of the tunnels over more optimal paths. This process of LSP restoration, pre-emption and re-routing may continue repeatedly, after a network failure or network recovery event. Thus to prevent tunnel flapping, and the resulting network overloading, congestion and wastage of communication bandwidth, the reroute history of the tunnels should be tracked and reroute should be dampened, wherever the reroute frequency exceeds the configured limit.

Any Backup LSP Flap Control according to an exemplary embodiment will now be described. In any case a reroute flapping LSP causes overloading the network with repeated signaling setup and teardown. A flapping LSP would also cause frequent bandwidth resource reservation and reservation releases which would trigger frequent advertisements of OSPF-TE Link state advertisements and/or ISIS-TE Link state advertisements in the traffic engineered network. In order to prevent flapping of backup LSP(s), the reroute interval or the reroute frequency should be tracked using a ARMA model. A reroute of the backup LSP reroute should be allowed, only if the cumulative weighted average of its' reroute frequency does not exceed a configurable upper threshold.

Tunnel Flap Control for Point-To-Multipoint Tunnels according to an exemplary embodiment will now be described. In the case of a P2MP TE Tunnel, the graph of the tunnel's path layout resembles a tree topology, which is referred as multicast distribution tree (MDT). In the MDT a single ingress LER termed as the Tree Root, originates the multicast traffic, which is distributed via traffic replication at intermediate LSR(s) termed as the branch nodes, towards the egress traffic receiving LER(s) termed as Leaf nodes of the Tree.

When the MDT of a P2MP Tunnel is contained fully inside a single TE domain, the tunnel is referred as Intra-domain P2MP TE Tunnel. However when the MDT spans multiple TE domains, the tunnel is referred as Inter-Domain P2MP TE Tunnel Similar to the case of P2P TE Tunnel, the topological path of a P2MP TE Tunnel may change due to various network events and traffic engineering network's resource re-optimization under a policy control.

When a P2MP TE Tunnel gets frequently re-routed, i.e. it's tree topology path layout changes very frequently, due to network events or network resource re-optimization, additional loads of RSVP-TE signaling traffic, and IGP-TE Link state re-advertisement may cause excessive processing overhead in the router/switches control plane and bandwidth wastage and congestion overhead on the communication links. The processing overload in the switching control plane and network congestion overhead may further trigger re-routing of the P2MP tunnels in an attempt to maintain traffic engineering SLA(s), which will only add to the existing congestion, resulting in tunnel re-route flapping. Thus to improve TE network efficiency and throughput, the P2MP TE Tunnel's reroute history should be monitored and reroute flapping if any should be dampened against configurable threshold parameters.

Policy Triggered Tunnel Flap Control according to an exemplary embodiment will now be described. Since during Network failure or network recovery event (NET-Event) TE Link resource properties change, Tunnel re-optimization policy may require tunnel to be re-routed over an alternate optimal path. Also due to TE-Event a Tunnel may require re-signaling and establishment over a new feasible path. Alternately the path of an existing Tunnel may become sub-optimal due to one or more TE-Event(s).

In either case Tunnel re-routing requires new optimal path computation and signaling re-establishment over the newly found path. However a single reroute operation itself would trigger update TE Link resource the path of an existing TE Tunnel may become the continuous re-routing of dynamic RSVP-TE & GMPLS-RSVP-TE signaled tunnels through the TE network constitute tunnel flaps, which is not desirable.

The continuous re-routing of MPLS & GMPLS tunnels due to policy applications, generates significant amount of processing overhead on the TE node's control plane and also consume Link B/W resources competing against the resources meant for SLA agreed customer traffic.

For example, a traffic engineered network 'Network_A':
Tunnel_A uses Path_A and have re-optimization policy 'Policy_A'.
Tunnel_B uses Path_B and have re-optimization policy 'Policy_B'.
Tunnel_C uses Path_C and have re-optimization policy 'Policy_C'
If after a sequence of IGP re-advertisements:
Policy_A causes Tunnel_A to be re-routed along Path_C.
Policy_C now finds Tunnel_C is along non-optimal path, and causes a re-route on Path_B.
Policy_B now finds Tunnel_B is along non-optimal path, and causes a re-route on Path_A.

The above sequence of Tunnel re-route may keep repeating depending of the availability of TE-Link B/W resources in different TE classes and the signaled TE classes of Tunnels (E-LSP, DiffServ-TE) and other TE constraints mandated by the Tunnel's policies. The situation becomes worse when there is no network Link or Node failures, but due to policy control, Tunnels get re-routed and TE-Link resource allocation/de-allocation across the network causes resource (B/W) availability fluctuation and hence resulting IGP-TE re-advertisements to reflect the up-to-date resource availabilities.

Since IGP-TE re-advertisements represent up-to-date availability of TE-Link resources (B/W), the Ingress nodes of Tunnels keep scheduling path computation to find more optimal path(s) that would satisfy the policy constraints. This cycle of network wide event flow, i.e. IGP-TE-Advertisement→Policy-Constrained-Path-Computation→Tunnel-Reroute→IGP-TE-Advertisement may cause a frequent or continuous re-routing of RSVP-TE & GMPLS-RSVP-TE signaled dynamic tunnels using the principle of 'Make-Before-Break' to satisfy the policy goals, even when there is no physical or logical faults in the traffic engineering network.

OAM Performance Triggered Tunnel Flap Control according to an exemplary embodiment will now be described. Monitoring and measuring SLA parameters of transport tunnel services is of primary importance in MPLS/GMPLS traffic engineered networks. Service providers expect quality of various real time and multimedia services that are transported over the MPLS/GMPLS tunnels to be guaranteed based on the agreed upon SLA parameters.

The SLA parameters usually include, but not limited to End-to-End Packet Delay, Packet Delay Variation, Packet Loss Ratio etc. When the measured values of Packet delay (PD) and Packet loss ratio (PLR) parameters of the LSP path exceeds the thresholds defined by the SLA contracts, the LSP is considered under-performing and a performance degradation alarm may be generated. In such scenarios, a traffic engineering policy may require the Tunnel to be repaired by causing a protection switch-over if there is a backup LSP.

The PD and PLR parameters for the backup LSP itself would be independently monitored and checked against SLA violation. When there is no backup LSP available or backup LSP's PD and PLR parameters are also violating SLA contract, the primary LSP would be re-routed to an alternate path, as a result of policy based re-optimization. However when there is a persistent congestion in the traffic engineered network, the rerouted LSPs on the alternate path(s) may again face SLA contract violation, because of measured PD and PLR parameters exceeding their thresholds. This may trigger another round of protection switch-over, re-optimization and re-routing over alternate paths.

This process may continue and the tunnel re-optimization may cause re-routing of the tunnels over a set of paths repeatedly in a cyclic manner, only to add signaling and routing updates message processing overhead to the TE router/switches in the TE domain.

To state formally, assume there are 'N' number of feasible paths $P(j) = \{LER\text{-}s, LSR(j,1), LSR(j,2) \ldots LSR(j,N-1), LSR(j,N), LER\text{-}d\}$, $1 \le j \le N$, in a traffic engineering domain 'TD-1', between the source TE node LER-s and destination TE node LER-d, that satisfy a set of TE constraints 'C', required for a TE Tunnel 'T(s, d, C)'. Also assume that initially a path P(x) from the collection of paths $Pset = \{P(1), P(2), \ldots P(N-1), P(N)\}$ is found to be optimal satisfying the constraints of the TE Tunnel 'T(s, d, C)'.

So initially the tunnel 'T(s, d, C)' would be established via signaling over the path P(x). After some measurement interval, let's assume the PD and PLR parameters for this tunnel are found to exceed the thresholds defined by the SLA contract. So as a part of re-optimization policy, the tunnel 'T(s, d, C)' would be re-routed over the next best path, say P(y), from the collection Pset.

After some measurement interval, assume the PD and PLR parameters for this tunnel on the new path P(y) too, are found to exceed the thresholds defined by the SLA contract. The tunnel 'T(s, d, C)' would be again re-routed over the next best path, say P(z), from the collection Pset. During a persistent network congestion, several path(s) in the TE network may be congested, and the PD, PLR measurements for the Tunnel may continue to show SLA violation. Thus re-optimization triggered reroute may cause tunnel to be continuously re-routed over the individual path(s) from the collection Pset, in a cyclic manner.

Such cyclic re-routing amounts to TE tunnel reroute flapping, since the Tunnel is not going to stay stable on any of the path(s) and the repeated re-routing would only add to the network overload and congestion. To avoid such reroute flapping scenarios, tunnel's re-route history needs to be monitored and re-route frequency should be dampened using a configurable threshold.

Tunnel Reroute Flap Dampening according to an exemplary embodiment will now be described. This embodiment may include a mechanism to track the reroute history of MPLS & GMPLS tunnels at the head-end routers over configured measurement intervals.

The re-route history can be defined as the number of policy based re-routes during the measurement interval, or a cumulative average number of re-routes during each recurring measurement interval. To compute a smooth cumulative average, the Auto-Regressive Moving Average (ARMA) model can be used.

To compute a more reliable averaging function, an extension of ARMA model that allow periodic parameter, i.e. 'Periodic Auto-Regressive Moving Average' (PARMA) model can be used. Since the PARMA model explicitly represent fluctuations in mean, standard deviation and auto-correlation, resulting in a more realistic 'Time Series' model that leads to more reliable tracking of Tunnel re-routing frequency averages.

In the PARMA model, the moving average can be estimated by a finite approximation involving k most recent observation. When the computed average of Tunnel re-route frequency exceeds a configurable threshold, the re-route is delayed by using an exponential back-off timer. The exponential back-off timer duration is derived as a function of a re-route dampening factor ($0 < F < 1$). When the tunnel re-route frequency is dampened using an exponential back-off timer, the tunnel flapping due to policy based re-routing can be reduced by tuning the value of dampening factor parameter (F).

An exemplary method facilitates optimal utilization of resources in the traffic engineered networks by eliminating or minimizing the tunnel flapping in the traffic engineered networks. By eliminating or minimizing Tunnel flapping the overhead of frequent and redundant tunnel re-routes can be minimized, which in turn results in minimization of:

Disturbances in the stability of the network resources;
Fluctuation of throughputs across the network;
Unnecessary overhead of signaling message processing in control plane Processors; and
Link B/W consumption and traffic congestion competing against the resources meant for SLA satisfying customer traffic.

The mechanism enables the TE networks to monitor any indication of excessive and repetitive Tunnel re-routes in real time and applies a re-route dampening procedure to eliminate the chances of Tunnel flapping to occur.

The exemplary method can be used to protect resources in the traffic engineered networks to maintain the SLA agreements against existing MPLS/GMPLS tunnels and also to predict availability of resources for new tunnel provisioning with specific resource/SLA requirements.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for tracking a re-routing history of Multi-Protocol Label Switching ("MPLS")/Generalized MPLS ("GMPLS") tunnels over intervals, the method comprising:
    measuring a number of policy-based re-routes of the MPLS/GMPLS tunnels during at least one measurement interval, wherein the policy-based re-routes comprise re-routing of the MPLS/GMPLS tunnels based on policy to optimize associated traffic engineering resources;
    determining a tunnel re-route frequency based on the measurement;
    comparing the tunnel re-route frequency to a frequency threshold;
    determining if the tunnel re-route frequency exceeds the frequency threshold; and
    delaying at least one tunnel re-route using an exponential back-off time with a duration derived as a function of a re-route dampening factor if the tunnel re-route frequency exceeds the frequency threshold avoiding tunnel flapping of the MPLS/GMPLS tunnels.

2. The method of claim 1, wherein determining the tunnel re-route frequency comprises calculating an average number of re-routes over the at least one measurement interval.

3. The method of claim 2, wherein the calculating the tunnel re-route frequency comprises using an Auto-Regressive Moving Average ("ARMA") model.

4. The method of claim 2, wherein the calculating the tunnel re-route frequency comprises using a Periodic Auto-Regressive Moving Average ("PARMA") model.

5. The method of claim 4, wherein using the PARMA model comprising estimating the average number of reroutes using a finite approximation based on a predetermined number of observations.

6. The method of claim 1, further comprising tuning the value of the re-route dampening factor.

7. A system for tracking a re-routing history of Multi-Protocol Label Switching ("MPLS")/Generalized MPLS ("GMPLS") tunnels over intervals, the system comprising:
a measuring module configured to measure a number of policy-based re-routes of the MPLS/GMPLS tunnels during at least one measurement interval, wherein the policy-based re-routes comprise re-routing of the MPLS/GMPLS tunnels based on policy to optimize associated traffic engineering resources;
a tunnel re-route frequency module configured to determine a tunnel re-route frequency based on the measurement;
a comparison module configured to compare the tunnel re-route frequency to a frequency threshold; and
a delaying module configured to delay at least one tunnel re-route using an exponential back-off time with a duration derived as a function of a re-route dampening factor if the tunnel re-route frequency exceeds the frequency threshold avoiding tunnel flapping of the MPLS/GMPLS tunnels.

8. The system of claim 7, wherein the tunnel re-route frequency module is configured to calculate an average number of re-routes over the at least one measurement interval.

9. The system of claim 8, wherein the tunnel re-route frequency module is configured to use an Auto-Regressive Moving Average ("ARMA") model.

10. The system of claim 8, wherein the tunnel re-route frequency module is configured to use a Periodic Auto-Regressive Moving Average ("PARMA") model.

11. The method of claim 10, wherein the tunnel re-route frequency module is configured to estimate the average number of re-routes using a finite approximation based on a predetermined number of observations.

12. The method of claim 7, wherein the exponential back-off timer is configured to tune the value of the re-route dampening factor.

13. A non-transitory computer program product residing on a processor-executable computer storage medium, the computer program product comprising processor-executable instructions configured to cause a processor to:
measure a number of policy-based re-routes of Multi-Protocol Label Switching ("MPLS")/Generalized MPLS ("GMPLS") tunnels during at least one measurement interval;
determine a tunnel re-route frequency based on the measurement, wherein the policy-based re-routes comprise re-routing of the MPLS/GMPLS tunnels based on policy to optimize associated traffic engineering resources;
compare the tunnel re-route frequency to a frequency threshold;
determine if the tunnel re-route frequency exceeds the frequency threshold; and
delay at least one tunnel re-route using an exponential back-off time with a duration derived as a function of a re-route dampening factor if the tunnel re-route frequency exceeds the frequency threshold avoiding tunnel flapping of the MPLS/GMPLS tunnels.

14. The non-transitory computer program product of claim 13, wherein determine the tunnel re-route frequency comprises calculating an average number of re-routes over the at least one measurement interval.

15. The non-transitory computer program product of claim 14, wherein the calculate the tunnel re-route frequency comprises using an Auto-Regressive Moving Average ("ARMA") model.

16. The non-transitory computer program product of claim 14, wherein the calculate the tunnel re-route frequency comprises using a Periodic Auto-Regressive Moving Average ("PARMA") model.

\* \* \* \* \*